United States Patent [19]

Mikami et al.

[11] Patent Number: 5,552,223
[45] Date of Patent: Sep. 3, 1996

[54] ORGANOPOLYSILOXANE MODIFIED POLYESTERS AND METHOD OF THE PREPARATION THEREOF

[75] Inventors: Ryuzo Mikami; Isao Ona, both of Chiba Prefecture, Japan

[73] Assignee: Dow Corning Toray Silicone Co., Ltd., Tokyo, Japan

[21] Appl. No.: 446,175

[22] Filed: May 19, 1995

Related U.S. Application Data

[62] Division of Ser. No. 143,678, Oct. 27, 1993.

[30] Foreign Application Priority Data

Oct. 30, 1992 [JP] Japan .................................. 4-315652

[51] Int. Cl.$^6$ ...................................................... B32B 9/00
[52] U.S. Cl. ............................ 428/391; 428/394; 525/29; 525/446; 525/447; 8/115.6; 8/116.1; 8/128.3; 8/115.64
[58] Field of Search ..................................... 525/446, 447, 525/29; 428/391, 394; 8/115.6, 116.1, 128.3, 115.64

[56] References Cited

U.S. PATENT DOCUMENTS

| 4,376,185 | 3/1983 | Alberts et al. | 525/29 |
| 4,472,465 | 9/1984 | Burrill | 427/387 |
| 4,766,163 | 8/1988 | Stradwick | 523/509 |
| 5,082,916 | 1/1992 | Mikami et al. | 528/26 |
| 5,290,320 | 3/1994 | Mikami et al. | 8/115 |

FOREIGN PATENT DOCUMENTS 3-74459  3/1991  Japan .

*Primary Examiner*—Mark D. Sweet
*Attorney, Agent, or Firm*—Timothy J. Troy

[57] ABSTRACT

The present invention relates to a novel organopolysiloxane-modified polyester and a method for the preparation thereof. The organopolysiloxane-modified polyester polymer comprises a polyester segment having a number average molecular weight of 300 to 15,000, a silicon-bonded hydrolyzable group-free organopolysiloxane segment, and a silicon-bonded hydrolyzable group-containing silicone segment. The compositions of the present invention are characterized by their ability to cure at room temperature in the presence of a condensation reaction-accelerating catalyst.

16 Claims, No Drawings

ORGANOPOLYSILOXANE MODIFIED POLYESTERS AND METHOD OF THE PREPARATION THEREOF

This is a divisional of copending application Ser. No. 08/143,678 filed on Oct. 27, 1993.

BACKGROUND OF THE INVENTION

The present invention relates to a novel organopolysiloxane-modified polyester in which there is grafted both silicon-bonded hydrolyzable group-free organopolysiloxanes and silicon-bonded hydrolyzable group-containing silicon compounds. The invention also relates to a method for the preparation of the novel organopolysiloxane-modified polyesters.

The modification of polyesters with organopolysiloxanes has long been known. This tactic is effective for improving such properties as water repellency, weather resistance, and slip. Among organopolysiloxane-modified polyesters, interest has most recently focused in particular on organopolysiloxane-grafted polyesters such as those disclosed in Japanese Patent Application Laid Open [Kokai or Unexamined] No. 3-74459 [74,459/1991]. Other organopolysiloxane-grafted polyesters have also been disclosed such as those described in Japanese Patent Application Laid Open No. 3-2221 [2,221/1991]. This organopolysiloxane-grafted polyester resin was disclosed as being useful as a modifier for various types of organic resins, for example, polyester resins, and polyurethane resins.

However, the organopolysiloxane-grafted polyester resins described above are noncrosslinking. As a result, when they are used, for example, as coatings, the resulting film is fragile and redissolves when brought into contact with a solvent. The development is therefore desired of an organopolysiloxane-grafted polyester resin that is capable of crosslinking at room temperature.

SUMMARY OF THE INVENTION

The present invention relates to a novel organopolysiloxane-modified polyester and a method for the preparation thereof. The organopolysiloxane-modified polyester comprises a polyester having a number average molecular weight of 300 to 15,000 which contains silicon-bonded hydrolyzable group-free organopolysiloxane groups and silicon-bonded hydrolyzable group-containing silicon compounds.

The instant invention takes as its object the introduction of a novel organopolysiloxane-grafted polyester that is capable of crosslinking at room temperature.

Another object of the instant invention is to produce compositions which can cure at room temperature in the presence of a condensation reaction-accelerating catalyst.

These and other features, objects and advantages of the present invention will be apparent upon consideration of the following detailed description of the invention.

DETAILED DESCRIPTION OF THE INVENTION

The present invention relates to organopolysiloxane-modified polyester graft copolymers comprising: (a) a polyester segment having a number average molecular weight of 300 to 15,000, (b) an organopolysiloxane segment, and (c) a silicon segment having at least one silicon-bonded hydrolyzable group in the segment, with the proviso that the organopolysiloxane segment (b) does not contain silicon-bonded hydrolyzable groups.

The main chain (segment) of the organopolysiloxane-modified polyester of the present invention comprises polyester, the polyester having a silicon bonded hydrolyzable group-free (SBHG-free) organopolysiloxane segment and a silicon-bonded hydrolyzable group-containing (SBHG-containing) silicon segment. Both segments are preferably bonded in a side chain position on the polyester main chain. The number average molecular weight of the polyester main chain should be 300 to 15,000. This polyester may be aliphatic polyester or aromatic polyester and may be linear or branched. The polyester segment (a) comprises from about 10 to about 79 weight percent of the copolymer.

The organopolysiloxane segment (b) may be bonded to the carboxylic acid moiety or alcohol moiety of the polyester, and it may be bonded directly to carbon in the carboxylic acid or alcohol moiety or may be bonded thereto across oxygen. The terminal groups of the polyester are preferably ester groups or hydroxyl groups.

The SBHG-free organopolysiloxane graft segment (b) of the polymer is preferably straight chain but can also be branched. Its degree of polymerization should be at least 2 but is not otherwise specifically restricted. However, at excessively large degrees of polymerization, acquisition becomes problematic and the corresponding precursor organopolysiloxane has a poor addition reactivity. For this reason, the degree of polymerization generally does not exceed 2,000 and is preferably 3 to 100 on average. The SBHG-free organopolysiloxanes of segment (b) are specifically exemplified by trimethylsiloxy-terminated dimethylpolysiloxanes, trimethylsiloxy-terminated methylalkyl ($C_2$–$C_{10}$) polysiloxanes, and trimethylsiloxy-terminated methylphenylpolysiloxanes. The organopolysiloxane segment (b) of the copolymer preferably comprises from about 20 to about 75 weight percent of the copolymer.

The SBHG-containing silicon compound graft segment (c) of the polymer of this invention contains no specific restrictions with respect to its molecular structure other than the requirement of containing a silicon-bonded hydrolyzable group. The silicon-bonded hydrolyzable group of segment (c) is nonexhaustively exemplified by alkoxy groups such as methoxy, ethoxy, propoxy, by acetoxy groups and groups such as methyl ethyl ketoxime. The silicon segment (c) of this invention is exemplified by polysiloxanes such as trimethoxysiloxy-terminated dimethylpolysiloxanes, and trimethoxysilylethyl-terminated dimethylpolysiloxanes. The silicon segment (c) preferably comprises from about 1 to about 15 weight percent of the copolymer of the instant invention.

The present invention further relates to a composition comprising a reaction product of: (A) an aliphatically unsaturated polyester having a number average molecular weight of 300 to 15,000, (B) an organopolysiloxane having at least one silicon-bonded hydrogen atom in its molecule, (C) a silicon compound having in its molecule at least one silicon-bonded hydrogen atom and at least one silicon-bonded hydrolyzable group, and (D) a hydrosilylation-reaction catalyst, wherein said reaction takes place in the presence of (D) and with the proviso that (B) is free of silicon-bonded hydrolyzable groups.

The present invention also relates to a method for the preparation of an organopolysiloxane-modified polyester, the method comprising reacting: (A) an aliphatically unsaturated polyester having a number average molecular weight of 300 to 15,000, (B) an organopolysiloxane having at least one silicon-bonded hydrogen atom in its molecule, (C) a silicon compound having in its molecule at least one silicon-bonded hydrogen atom and at least one silicon-bonded hydrolyzable group, in the presence of (D) a hydrosilylation-reaction catalyst, with the proviso that (B) is free of silicon-bonded hydrolyzable groups.

The polyester comprising the component (A) used in the preparative method and the compositions of the present invention consists of an aliphatically unsaturated polyester with a number average molecular weight of 300 to 15,000. The bases for this molecular weight range are as follows: at below 300, the curing rate is slow; at above 15,000, the solvent solubility is reduced and the processability is therefore poor.

Methods for the preparation of component (A) are non-exhaustively exemplified by (i) the condensation reaction of a polyvalent carboxylic acid with an aliphatically unsaturated polyhydric alcohol, and (ii) the condensation reaction of polyhydric alcohol with aliphatically unsaturated polyvalent carboxylic acid.

The polyvalent carboxylic acid cited hereinabove is exemplified by phthalic acid, isophthalic acid, terephthalic acid, tetrahydrophthalic acid, tetrachlorophthalic acid, oxalic acid, malonic acid, succinic acid, adipic acid, sebacic acid, cyclopentanedicarboxylic acid, trimellitic acid, and pyromellitic acid. The aliphatically unsaturated polyvalent carboxylic acids are exemplified by allyloxyisophthalic acid, allyloxyterephthalic acid, and allylmalonic acid. These carboxylic acids may be used singly or in combinations of two or more.

The form of the polyvalent carboxylic acid component, i.e., the carboxylic acid or derivative thereof (for example an alkyl ester or halide) is selected as appropriate to the particular polycondensation method.

The polyhydric alcohol cited hereinabove is exemplified by ethylene glycol, propylene glycol, butanediol, hexamethylene glycol, hydrogenated bisphenol A, neopentyl glycol, diethylene glycol, triethylene glycol, dipropylene glycol, glycerol, trimethylolpropane, trimethylolethane, and pentaerythritol. The aliphatically unsaturated polyhydric alcohol hereinabove is exemplified by glycerol monoallyl ether, trimethylolpropane monoallyl ether, trimethylolethane monoallyl ether, pentaerythritol monoallyl ether, and pentaerythritol diallyl ether. These alcohols may be used singly or in combinations of two or more.

The residual carboxylic acid or carbinol functional groups in this component are preferably blocked with a silylating agent such as trimethylmonochlorosilane, hexamethyldisilazane, and so forth.

The organopolysiloxane comprising component (B) used in the preparative method and compositions of the invention contains at least the silicon-bonded hydrogen atom in its molecule and is free of silicon-bonded hydrolyzable groups. It may have a straight-chain, branched-chain, or network structure, but straight-chain structures are preferred. Methods for the preparation of this component are known. Its molecular weight is not specifically restricted, but its average degree of polymerization is preferably 3 to 300 and particularly preferably 5 to 200. The organic groups present in addition to silicon-bonded hydrogen are exemplified by alkyl groups such as methyl, ethyl, propyl, butyl, pentyl, hexyl, heptyl, octyl, and so forth; aryl groups such as phenyl, naphthyl, and so forth; and aralkyl groups such as benzyl, phenethyl, and so forth. Methyl preferably makes up at least half of the organic groups. The amount of Component (B) in the compositions and method of this invention is preferably from about 25 to as much as 400 weight parts per 100 weight parts of Component (A).

The silicon compound comprising the component (C) used in the preparative method and compositions of the invention contains at least one silicon-bonded hydrogen and at least one silicon-bonded hydrolyzable group in its molecule. The silicon-bonded hydrolyzable group in this component may be any such group that does not inhibit the addition reaction. Molecular weights are preferred for this component that permit purification by distillation. The organic groups present in addition to the Si-bonded hydrogen and Si-bonded hydrolyzable group are exemplified by the organic groups listed in the preceding description of component (B).

Component (C) is exemplified by organopolysiloxanes with the following chemical structures:

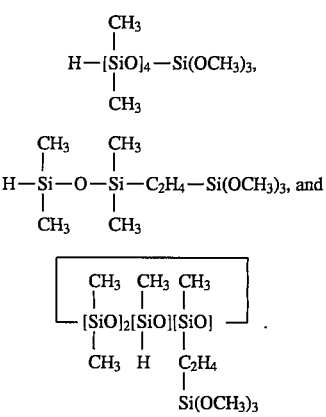

Other examples are trimethoxysilane, methyldimethoxysilane, triacetoxysilane, and tri(methyl ethyl ketoxime)silane. The amount of Component (C) in the compositions and method of this invention is preferably from about 1 to about 50 weight parts per 100 weight parts of Component (A).

The hydrosilylation-reaction catalyst comprising component (D) in the preparative method of the invention is used in order to effect grafting of components (B) and (C) onto component (A) through an addition reaction. This hydrosilylation-reaction catalyst encompasses the complexes of transition metals such as platinum, palladium, rhodium, ruthenium, cobalt, and nickel. Platinum group catalysts such as chloroplatinic acid, platinum/olefin complexes, and chloroplatinic acid/vinylsiloxane complexes, are preferred because they have high catalytic activities and produce few secondary reactions. The amount of Component (D) in the compositions and method of this invention is preferably from about 1 to about 100 weight parts per 1,000,000 weight parts of Components (A), (B), and (C).

The preparative method of the present invention comprises the execution of an addition reaction in the presence or component (D) among the components (A), (B), and (C) as described hereinbefore. The reaction of this preparative method is preferably carried out under conditions such that the number of moles of aliphatically unsaturated bonds in component (A) exceeds the sum of the number of moles of Si-bonded hydrogen in component (B) and the number of moles of Si-bonded hydrogen in component (C). The general range for the reaction temperature is room temperature to 150° C., while the preferred range is 60° C. to 150° C. in order to shorten the reaction time and suppress secondary reactions. Solvent can be used in the preparative method of the instant invention in addition to the components described above. Operable solvents are exemplified by aromatic hydrocarbons such as benzene, toluene, and xylene; acetate esters such as ethyl acetate, and Cellosolve acetate; and ethers such as diethyl ether, and tetrahydrofuran.

The present invention further relates to curable composition comprising (A) an aliphatically unsaturated polyester having a number average molecular weight of 300 to 15,000, (B) an organopolysiloxane having at least one silicon-bonded hydrogen atom in its molecule, (C) a silicon compound having in its molecule at least one silicon-bonded hydrogen atom and at least one silicon-bonded hydrolyzable group, (D) a hydrosilylation-reaction catalyst, and (E) a condensation reaction-accelerating catalyst, with the proviso that (B) is free of silicon-bonded hydrolyzable groups. Components (A)–(D) are as delineated above including amounts and preferred embodiments thereof.

The organopolysiloxane-modified polyester of the present invention contains Si-bonded hydrolyzable groups originating with component (C), thus it is capable of curing at room temperature in the presence of (E) a condensation reaction-accelerating catalyst. The condensation reaction-accelerating catalysts suitable for use as component (E) in the instant invention is nonexhaustively exemplified by titanate esters such as tetraisopropyl titanate, and tetrabutyl titanate; titanium chelates such as di-n-butoxytitanium bis(ethyl acetylacetate), and diisopropoxytitanium bis(acetylacetate); organotin compounds such as dibutyltin diacetate, dibutyltin octoate, and tin octoate; and organic amines such as guanidine. Component (E) is present in an amount sufficient to initiate the curing reaction with Component (C). The amount of Component (E) in the compositions of this invention is preferably from about 0.01 to 100 weight parts of the reaction product of (A), (B), (C), and (D), and it is highly preferred for purposes of the present invention that Component (E) be present in an amount from about 0.1 to 50 weight parts per 100 weight parts of the reaction product of Components (A), (B), (C), and (D).

The organopolysiloxane-modified polyesters of the present invention are useful as a reactive intermediate and is particularly useful as a coating or fiber-treatment agent where properties such as releasability, water repellency, slip, etc., are sought. Textile fibers, fabrics, or yarns such as woven and nonwoven fabrics, wool, cotton, silk, and synthetic fibers can be treated with the compositions of the instant invention.

The instant invention will be explained in greater detail below through working examples. In the examples, parts indicates weight parts, Mn is an abbreviation for number-average molecular weight, and Mw is an abbreviation for weight-average molecular weight.

EXAMPLE 1

The following were introduced into a 1 L four-neck flask equipped with stirrer, thermometer, reflux condenser equipped with distillation column, and nitrogen inlet tube: 290.4 parts isophthalic acid. 174.7 parts neopentyl glycol, 58.7 parts glycerol monoallyl ether, and 20 mL xylene. A reaction was carried out by heating to 220° C. to 230° C. while stirring. The reaction was stopped when the acid value reached ≦5, and an unsaturated polyester resin was recovered by vacuum distillation of the low boilers. This unsaturated polyester resin had a vinyl content of 2.6 weight % and a carbinol content of 1.6 weight %.

100 parts of this unsaturated polyester resin product and 150 parts toluene were placed in a 500 mL four-neck flask equipped with stirrer, thermometer, reflux condenser, and nitrogen inlet tube, and the contents of the flask were heated to the reflux temperature while stirring. Once the unsaturated polyester resin had dissolved in the toluene, 10 parts hexamethyldisilazane was added in order to trimethylsilylate the carbinol groups in the unsaturated polyester resin. After then reacting for approximately 10 hours while heating at reflux, the toluene and unreacted hexamethyldisilazane were removed by vacuum distillation to yield an unsaturated polyester resin that was solid at room temperature. Table 1 reports the molecular weights (measured by gel permeation chromatography) of the polyester resin before and after silylation. In addition, the chemical shift originating with the silicon-bonded methyl in the silylated polyester resin was evaluated based on the results from proton nuclear magnetic resonance (NMR) analysis. These results confirmed that silylation of the unsaturated polyester resin had developed without the occurrence of secondary reactions during the silylation reaction, for example, without polyester decomposition. The silylated polyester had a vinyl content of 2.4 weight %.

TABLE 1

|  | pre-silylation | post-silylation |
| --- | --- | --- |
| Mn | $3.03 \times 10^3$ | $3.34 \times 10^3$ |
| Mw | $6.12 \times 10^3$ | $6.37 \times 10^3$ |
| area (%) | 99.2 | 99.7 |

EXAMPLE 2

10 parts of the unsaturated polyester resin synthesized in Example 1 (vinyl equivalents=0.0088 moles) and 148.5 parts toluene were introduced into a 300 mL four-neck flask equipped with stirrer, thermometer, reflux condenser, and nitrogen inlet tube and heated to 70° C. while stirring. Once the unsaturated polyester resin had dissolved, 6.5 parts of a dimethylpolysiloxane having the formula (a) described hereinbelow (number average molecular weight=1,821, SiH equivalents=0.0036 moles) was added with stirring.

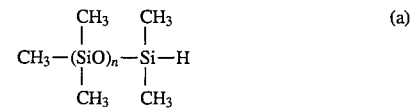

This was followed by the addition of 0.02 mL platinum/vinylsiloxane complex (platinum concentration=4.4 weight %) prepared from chloroplatinic acid and 1,3-divinyltetramethyldisiloxane. A reaction was run for approximately 90 minutes at 70° C. Subsequent to this reaction, organopolysiloxane-modified polyester resin was obtained by the addition with stirring of 15 parts of a 10% tetrahydrofuran solution of trimethoxysilyl-containing dimethylpolysiloxane with formula (b) described hereinbelow (SiH content= 0.0036 moles).

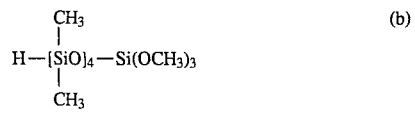

The results of infrared spectrochemical (IR) analysis and NMR analysis of this organopolysiloxane-modified polyester resin confirmed it to be a dimethylpolysiloxane-grafted polyester resin in which the dimethylpolysiloxane and trimethoxysilyl-containing dimethylpolysiloxane were grafted.

A room-temperature-curable composition was prepared by the addition of 0.05 parts tetraisopropyl titanate to 20 parts of this dimethylpolysiloxane-modified polyester resin.

This room-temperature-curable composition was coated on an aluminum test panel, and a cured film was produced by standing at room temperature for 4 days. When toluene was dripped onto the resulting cured film, dissolution did not occur and swelling of the cured film was observed. These test results served to confirm that this dimethylpolysiloxane-modified polyester resin in accordance with the present invention could undergo crosslinking at room temperature through condensation of its silicon-bonded hydrolyzable groups.

EXAMPLE 3

8.2 parts of the unsaturated polyester resin (vinyl equivalents=0.0072 moles) synthesized in Example 1 and 124 parts tetrahydrofuran were introduced into a 500 mL four-neck flask equipped with stirrer, thermometer, reflux condenser, and nitrogen inlet tube and heated to 62° C. while stirring. Once the unsaturated polyester resin had dissolved, 21.3 parts of a dimethylpolysiloxane having the formula (a) as described hereinabove (molecular weight=6,250, SiH equivalents=0.0034 moles) was added with stirring. This was followed by the addition of 0.02 mL of a platinum/vinylsiloxane complex (platinum concentration= 4.4 weight %) and reacted at 65° C. for approximately 90 minutes. 1.5 parts trimethoxysilyl-containing dimethylpolysiloxane (SiH equivalents=0.0036 moles) having the formula (b) as described hereinabove was then added with stirring. After cooling, 155 parts tetrahydrofuran was added to yield the organopolysiloxane-modified polyester resin product. The results of IR analysis and NMR analysis of this organopolysiloxane-modified polyester resin confirmed it to be a dimethylpolysiloxane-grafted polyester resin in which the dimethylpolysiloxane and trimethoxysilyl-containing dimethylpolysiloxane were grafted. A room-temperature-curable composition was prepared by the addition with mixing of 1.6 parts 10% tetrahydrofuran solution of tetraisopropyl titanate to the dimethylpolysiloxane-modified polyester resin product. The resulting tetrahydrofuran solution of the room-temperature-curable composition was coated on an aluminum test panel, and a cured film was produced by standing for 4 days at room temperature. Commercial cellophane tape was applied to this cured film and then peeled off at an angle of 180° and a stripping rate of 30 cm/minute using a tensile tester in order to measure the force required for stripping. A low value of 50 g/5 cm was measured. In addition, the water repellency was evaluated by the application of water droplets to the surface of the cured film, and the cured film was thereby determined to have an excellent water repellency.

In addition, polyester staple was immersed in the tetrahydrofuran solution of the room-temperature-curable composition to give a 0.5% add-on of the room-temperature-curable composition. No heating was conducted after this treatment, rather, the polyester staple was allowed to stand at room temperature. The fiber-to-fiber friction coefficients were measured on the treated polyester staple with the following results: static friction coefficient=0.110, dynamic friction coefficient=0.098. The untreated polyester staple had the following values: static friction coefficient=0.33, dynamic friction coefficient=0.23. These results thus confirmed that the dimethylpolysiloxane-modified polyester resin in accordance with the present invention makes an excellent fiber-treatment agent.

EXAMPLE 4

2.5 parts of the unsaturated polyester resin synthesized in Example 1 (vinyl equivalents=0.0022 moles) and 53.1 parts tetrahydrofuran were placed in a 100 mL four-neck flask equipped with stirrer, thermometer, reflux condenser, and nitrogen inlet tube and were heated to 60° C. while stirring. Once the unsaturated polyester resin had dissolved, 3.4 parts of a dimethylpolysiloxane with formula (a) above (molecular weight=4,000, SiH equivalents=0.00085 moles) was added with stirring. This was followed by the addition of 0.02 mL of the platinum/vinylsiloxane complex with platinum concentration=4.4 weight %. After a reaction for approximately 90 minutes at 65° C., 3 parts of a 10% tetrahydrofuran solution of trimethoxysilyl-containing silicone compound having the following formula (c) (SiH equivalents=0.0011 moles)

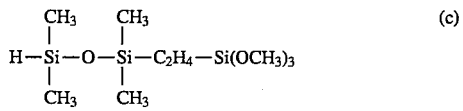

was added with stirring. Further reaction at 65° C. yielded an organopolysiloxane-modified polyester resin. The results of IR and NMR analyses of this organopolysiloxane-modified polyester resin confirmed it to be a dimethylpolysiloxane-grafted polyester resin in which the dimethylpolysiloxane and trimethoxysilyl-containing dimethylpolysiloxane were grafted. A room-temperature-curable composition was prepared by the addition of 0.10 parts tetraisopropyl titanate to 20 parts of this dimethylpolysiloxane-modified polyester resin. This room-temperature-curable composition was applied on an aluminum test panel, and a cured film was produced by standing for 4 days at room temperature. When toluene was dripped onto the resulting cured film, dissolution did not occur and swelling of the cured film was observed. Commercial cellophane tape was applied on this cured film and then peeled off at an angle of 180° and a stripping rate of 30 cm/minute using a tensile tester in order to measure the force required for stripping. A low value of 50 g/5 cm was measured. Moreover, no transfer of dimethylpolysiloxane to the cellophane tape was observed. Finally, the water repellency was evaluated by the application of water droplets to the surface of the cured film, and the cured film was thereby determined to have an excellent water repellency.

It should be apparent from the foregoing that many other variations and modifications may be made in the compounds, compositions and methods described herein without departing substantially from the essential features and concepts of the present invention. Accordingly it should be clearly understood that the forms of the invention described herein are exemplary only and are not intended as limitations on the scope of the present invention as defined in the appended claims.

That which is claimed is:

1. An organopolysiloxane-modified polyester prepared by a process comprising the step of:
    (I) reacting a mixture of:
        (A) an aliphatically unsaturated polyester having a number average molecular weight of 300 to 15,000;
        (B) an organopolysiloxane having at least one silicon-bonded hydrogen atom in its molecule; and
        (C) a silicon compound selected from the group consisting of

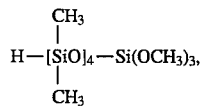

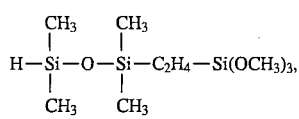

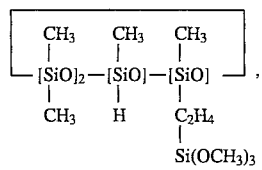

trimethoxysilane, methyldimethoxysilane, triacetoxysilane, and tri(methyl ethyl ketoxime)silane in the presence of:
   (D) a hydrosilylation-reaction catalyst to form a reaction product, with the proviso that (B) is free of silicon-bonded hydrolyzable groups.

2. A polyester according to claim 1, wherein the catalyst is selected from the group consisting of platinum, palladium, rhodium, ruthenium, cobalt, and nickel.

3. A polyester according to claim 2, wherein the platinum group catalyst is selected from the group consisting of chloroplatinic acid, platinum/olefin complexes, and chloroplatinic acid/vinylsiloxane complexes.

4. A polyester according to claim 1, wherein the mixture of (I) further comprises a solvent.

5. A polyester according to claim 4, wherein the solvent is selected from the group consisting of aromatic hydrocarbons, acetate esters, and ethers.

6. A polyester according to claim 5, wherein the aromatic hydrocarbon is selected from the group consisting of benzene, toluene, and xylene, the acetate ester is selected from the group consisting of ethyl acetate and Cellosolve acetate, and the ether is selected from the group consisting of diethyl ether and tetrahydrofuran.

7. A room temperature curable composition prepared by a process comprising the steps of:
   (I) reacting a mixture of:
      (A) an aliphatically unsaturated polyester having a number average molecular weight of 300 to 15,000;
      (B) an organopolysiloxane having at least one silicon-bonded hydrogen atom in its molecule; and
      (C) a silicon compound selected from the group consisting of

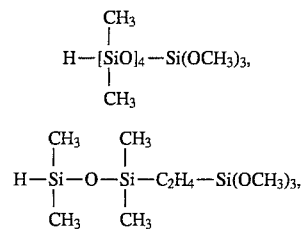

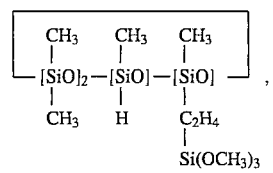

trimethoxysilane, methyldimethoxysilane, triacetoxysilane, and tri(methyl ethyl ketoxime)silane in the presence of:
   (D) a hydrosilylation-reaction catalyst to form a reaction product; and
(II) adding to the reaction product of step (I):
   (E) a condensation reaction-accelerating catalyst, with the proviso that (B) is free of silicon-bonded hydrolyzable groups.

8. A composition according to claim 7, wherein (E) is selected from the group consisting of titanate esters, titanium chelates, organotin compounds, and organic amines.

9. A composition according to claim 8, wherein the titanate ester is selected from the group consisting of tetraisopropyl titanate, and tetrabutyl titanate, the titanium chelate is selected from the group consisting of di-n-butoxytitanium bis(ethyl acetylacetate) and diisopropoxytitanium bis(acetylacetate), the organotin compound is selected from the group consisting of dibutyltin diacetate, dibutyltin octoate, and tin octoate, and the organic amine is guanidine.

10. A composition according to claim 7, wherein the mixture of (I) further comprises a solvent.

11. A composition according to claim 10, wherein the solvent is selected from the group consisting of aromatic hydrocarbons, acetate esters, and ethers.

12. A composition according to claim 11, wherein the aromatic hydrocarbon is selected from the group consisting of benzene, toluene, and xylene, the acetate ester is selected from the group consisting of ethyl acetate and Cellosolve acetate, and the ether is selected from the group consisting of diethyl ether and tetrahydrofuran.

13. A fiber treated with the organopolysiloxane-modified polyester of claim 1.

14. A fiber treated with the room temperature curable composition of claim 2.

15. A treated fiber according to claim 13, wherein the fiber is selected from woven fabrics, nonwoven fabrics, wool, cotton, silk, or synthetic fibers.

16. A treated fiber according to claim 14, wherein the fiber is selected from woven fabrics, nonwoven fabrics, wool, cotton, silk, or synthetic fibers.

* * * * *